2,785,193

PREPARATION OF SULFONATED FATTY-ACID NITRILES

Bruno Blaser, Dusseldorf-Urdenbach, and Gunther Tischbirek, Dusseldorf-Benrath, Germany, assignors to Henkel & Cie. G. m. b. H., Dusseldorf-Holthausen, Germany, a German corporation No Drawing. Application September 23, 1953, Serial No. 381,957

Claims priority, application Germany October 14, 1952

5 Claims. (Cl. 260—465.1)

This invention relates to improvements in the preparation of sulfonated fatty-acid nitriles.

One object of the invention is the sulfonation of nitriles of water insoluble fatty-acids. This and still further objects will become apparent from the following description:

In accordance with the invention, sulfo groups are introduced into nitriles of saturated water insoluble fatty acids and sulfonated fatty-acid nitriles are formed by reacting sulfur trioxide or sulfur trioxide ether addition products with the nitriles.

The starting nitriles, in accordance with the invention, are nitriles of water insoluble fatty-acids having from 8 to 25 and preferably 10 to 22 carbon atoms. The nitriles are prepared from these water insoluble fatty-acids in the conventional manner by reacting the free fatty-acid with ammonia at elevated temperatures. The crude product obtained is preferably purified by distillation or in some other conventional manner prior to further processing in accordance with the invention. Nitriles, however, obtained in any other manner may be sulfonated in accordance with the invention.

The sulfonating agents, in accordance with the invention, are sulfur trioxide and its adducts, i. e. addition products, with for example, halogen-containing or cyclic ethers. Thus, for example, there may be used sulfur trioxide adducts with diethyl ether, dichlorodiethyl ether, dipropyl ether or mixed ethers. The ethers are preferably those having at most 6 carbon atoms in the molecule. In addition, sulfur trioxide adducts with dioxane or other cyclic ethers may be used.

The sulfonation, in accordance with the invention, is merely effected by contacting the reactants with each other. Although the course of the reaction is not dependent upon the sequence in which this contacting is effected, it is, nevertheless, preferable to add the sulfonating agent to the nitrile. If sulfur trioxide is used as the sulfonating agent, it may be introduced into the nitrile by means of an inert gas, as, for example, carbon dioxide, nitrogen or air. If sulfur trioxide ether adducts are used, which are frequently liquid and, therefore, easy to handle, the two reactants may be simply mixed together in the desired quantity ratio and a high reaction velocity occurs which renders this mode of operation particularly suitable for continuous operation. Both in batch and continuous operation, a portion of the mixture which has already reacted may be present during the reaction and thus a portion of the reaction mixture may be recycled in continuous operation.

If it is desired to only slightly sulfonate the nitrile, it is sufficient to add the sulfonating agent in amounts smaller than the stoichiometric quantity. When such amounts are used, there are obtained nitriles which are emulsifiable in water to a greater or lesser extent, depending on the number of sulfonic acid radicals introduced. The minimum quantity of sulfonic acid radical to be introduced is about 10 molar percent referring to the fatty-acid nitrile used. If complete sulfonation is desired, it is advisable to use an excess of the sulfonating agent of about 5–20 molar percent of the fatty-acid nitrile used.

The reaction is strongly exothermic and will commence at temperatures as low as about −30° C., particularly when using free sulfur trioxide. The reaction velocity increases with the temperature. In order to be able to control the reaction properly, it is advisable not to permit the temperature to rise above +60° C. The preferred temperatures for the reaction are between −20° C. and +40° C. The heat produced during the reaction may be removed in the conventional manner by external or internal cooling. If the reaction is effected in the presence of solvents or diluents, the heat evolved may be removed by permitting the solvent to boil off. The evaporated solvent may be recondensed by cooling and/or by pressure and recycled through the reaction vessel. As solvents, there may be used liquid organic or inorganic compounds which are inert to the sulfur trioxide or its ether adducts. Suitable solvents are, for example, sulfur dioxide, carbon disulfide, ethylene dichloride, perchloroethylene and other chlorinated, fluorinated or mixed halogenated low aliphatic hydrocarbons. If ether adducts of sulfur trioxide are used for the sulfonation, an excess of ether insofar as it will dissolve the nitrile may be used as the solvent. Any desired mixture of such solvents may be used.

If the reaction is effected in the presence of a solvent, it is advisable to remove the solvent as well as the ethers possibly present which have been liberated from the sulfur trioxide ether adduct before or after the neutralization of the sulfonation product.

The neutralization of the sulfonation product is effected in the conventional manner, possibly with cooling. As neutralization agents, there may be used caustic soda solution, caustic potash solution, ammonia, triethanolamine or other organic bases. The sulfonation product is preferably passed into the caustic solution with vigorous stirring.

The sulfonates formed in accordance with the invention have excellent foaming, wetting and dispersing properties and may be used in all branches of the detergent and cleanser industry, in the treatment of metals and in the finishing of textiles.

The following examples are given by way of illustration and not of limitation:

Example 1

Eight grams of sulfur trioxide are introduced by means of a dry stream of nitrogen or carbon dioxide into 18 grams lauric acid nitrile, with icewater cooling and good agitation. The reaction temperature should not exceed +5° C. The nitrile, which is colorless at the start, assumes a brown coloration and deposits a solid product. After the sulfur trioxide has been introduced, the unreacted nitrile can be removed by suction filtering or centrifuging and the solid residue cleaned by washing with ether. There is obtained a yellow solid residue (20 grams) which is soluble in water, forming a clear solution, and the acid solution of which foams greatly. The solid product is placed in cold dilute caustic soda solution to neutralize it.

Example 2

Forty-five grams of lauric acid nitrile are dissolved in 150 milliliters liquid sulfur dioxide at −15° C. and thereupon a solution of 22 grams sulfur trioxide in 100 milliliters liquid sulfur dioxide of −20° C. is slowly introduced while stirring. The reaction heat is removed by permitting the solvent to boil off. A yellowish product soon precipitates from the solution. The product is separated by filtration or evaporation of the solvent, and the residue, which is free of sulfur dioxide, is introduced into ice-cold dilute caustic soda solution. The neutral product is colorless; its aqueous solutions foam greatly.

*Example 3*

Fifty grams of an acid nitrile of coconut oil are dissolved in 100 milliliters ethylene dichloride, whereupon a solution of 22 grams sulfur trioxide in 150 milliliters ethylene dichloride are added at room temperature. The reaction temperature is maintained by external cooling with tap water at, at most, 50° C. After the completion of the reaction, the mixture is introduced into dilute caustic soda solution and the solvent is separated. By concentrating the aqueous phase by evaporation, there is obtained a solid colorless salt, the aqueous solution of which foams greatly.

*Example 4*

Fifty-nine grams of a palmitic acid nitrile are dissolved in 100 milliliters perchlorethylene and a solution of 22 grams sulfur trioxide in 150 milliliters perchlorethylene are added at room temperature. The reaction vessel is cooled with tap water on the outside. After the completion of the reaction, the mixture is introduced into dilute caustic soda solution and the solvent is separated. By concentrating the aqueous phase by evaporation, there is obtained a solid colorless salt, the aqueous solution of which foams greatly.

*Example 5*

Thirty-seven grams of lauric acid nitrile are dissolved in 50 milliliters ethylene dichloride and there is added thereto, at room temperature, a solution obtained by adding 17.6 grams sulfur trioxide at 0° C. to a mixture of 31.5 grams dichlorethyl ether and 65 milliliters ethylene dichloride. After heating briefly to 80° C., the cooled solution is neutralized with dilute caustic soda solution. By separating the solvent and concentrating the aqueous phase by evaporation, there is obtained a salt which is very readily soluble in water and the aqueous solutions of which foam and have good wetting and washing properties.

*Example 6*

Forty-five grams lauric acid nitrile are dissolved in 100 milliliters ethylene dichloride and there is added thereto, at room temperature, a solution obtained by combining 12 grams dioxane, 100 milliliters ethylene dichloride and 22 grams sulfur trioxide at 0° C. After the addition, it is heated briefly to 80–90° C. and the cooled solution is neutralized with dilute caustic soda solution. By separating the solvent and concentrating the aqueous phase by evaporation, there is obtained a salt which is readily soluble in water and the aqueous solutions of which foam greatly and have good wetting and washing properties.

We claim:

1. Method for the preparation of sulfonated fatty-acid nitriles which comprises contacting a nitrile of a saturated water insoluble fatty-acid having 8 to 25 carbon atoms with a sulfonation agent selected from the group consisting of sulfur trioxide and sulfur trioxide ether adducts at a temperature not in excess of 60° C., and recovering a sulfonated fatty-acid nitrile.

2. Method according to claim 1 in which said water insoluble fatty-acid nitrile has 10 to 22 carbon atoms.

3. Method according to claim 1 in which said contacting is effected in the presence of an inert solvent.

4. Method according to claim 1 in which said contacting is effected at a temperature between −30 and +60° C.

5. Method according to claim 4 in which said contacting is effected at a temperature between −20 and +40° C.

References Cited in the file of this patent

UNITED STATES PATENTS

| | | |
|---|---|---|
| 2,290,167 | Datin | July 21, 1942 |
| 2,460,968 | Bert et al. | Feb. 8, 1949 |
| 2,495,105 | Kaplan | Jan. 17, 1950 |